(12) United States Patent
Takahashi et al.

(10) Patent No.: US 10,916,269 B2
(45) Date of Patent: Feb. 9, 2021

(54) MAGNET FOR MOTOR OF MAGNETIC STORAGE DEVICE

(71) Applicant: Western Digital Technologies, Inc., Irvine, CA (US)

(72) Inventors: Toshio Takahashi, Tokyo (JP);
Kazushi Tsuwako, Tokyo (JP);
Masamichi Sakauchi, Kanagawa (JP);
Takako Hayakawa, Kanagawa (JP);
Kouki Uefune, Kanagawa (JP)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 16/553,881

(22) Filed: Aug. 28, 2019

(65) Prior Publication Data

US 2020/0265868 A1     Aug. 20, 2020

Related U.S. Application Data

(60) Provisional application No. 62/807,543, filed on Feb. 19, 2019.

(51) Int. Cl.
| | | |
|---|---|---|
| *G11B 5/55* | (2006.01) | |
| *G11B 21/02* | (2006.01) | |
| *G11B 33/14* | (2006.01) | |
| *H02K 41/035* | (2006.01) | |
| *G11B 21/08* | (2006.01) | |

(52) U.S. Cl.
CPC .......... *G11B 21/02* (2013.01); *G11B 5/5521* (2013.01); *G11B 5/5573* (2013.01); *G11B 21/025* (2013.01); *G11B 21/083* (2013.01); *G11B 33/148* (2013.01); *H02K 41/0354* (2013.01)

(58) Field of Classification Search
CPC ..................................................... G11B 5/5573
USPC ...................................................... 360/264.9
See application file for complete search history.

(56) References Cited

U.S. PATENT DOCUMENTS

| | | | | |
|---|---|---|---|---|
| 5,171,937 A | * | 12/1992 | Aldissi | H01B 11/1066 |
| | | | | 174/102 SC |
| 6,380,294 B1 | * | 4/2002 | Babinec | C08K 3/08 |
| | | | | 524/440 |
| 7,438,768 B2 | | 10/2008 | Sakaki et al. | |
| 8,659,849 B2 | | 2/2014 | Hayakawa et al. | |
| 9,911,292 B1 | * | 3/2018 | Khoshkava | H02J 7/02 |
| 2002/0015263 A1 | * | 2/2002 | Ooi | G11B 5/5521 |
| | | | | 360/264.9 |
| 2004/0149357 A1 | * | 8/2004 | Kakimoto | B01J 3/08 |
| | | | | 148/301 |
| 2012/0113548 A1 | * | 5/2012 | Yamada | G11B 5/5569 |
| | | | | 360/264.9 |
| 2014/0349099 A1 | * | 11/2014 | Kawashita | C22C 38/005 |
| | | | | 428/220 |
| 2018/0226180 A1 | * | 8/2018 | Kawashita | B22F 1/0062 |

* cited by examiner

*Primary Examiner* — Jefferson A Evans
(74) *Attorney, Agent, or Firm* — Kunzler Bean & Adamson

(57) ABSTRACT

Disclosed here is a magnet for use in a motor. The magnet comprises a magnet body. The magnet body comprises a plurality of coated magnetic granules. Each coated magnetic granule of the plurality of coated magnetic granules comprises a magnetic granule and a metallic layer coating the magnetic granule.

20 Claims, 7 Drawing Sheets

MAGNET FOR MOTOR OF MAGNETIC STORAGE DEVICE

CROSS-REFERENCE TO RELATED APPLICATION

This application claims the benefit of U.S. Provisional Patent Application No. 62/807,543, filed Feb. 19, 2019, which is incorporated herein by reference in its entirety.

FIELD

This disclosure relates generally to magnetic storage devices, and more particularly to magnets used in hydrogen-filled hard disk drives.

BACKGROUND

Some conventional hard disk drives are filled with helium to improve the performance and reliability of the hard disk drives. Recently, some hard disk drives are being filled with hydrogen to enable a further reduction in the power consumption of the hard disk drives compared to that of helium, which is the conventional filler gas for hard disk drives. However, the unique characteristics of hydrogen, relative to helium, introduce unforeseen performance and reliability issues that require consideration.

SUMMARY

The subject matter of the present application has been developed in response to the present state of the art, and, in particular, in response to the problems and needs of conventional hard disk drives, such as the shortcomings of conventional magnets in hydrogen-filled hard disk drives. In view of the foregoing, the subject matter of the present application has been developed to provide a magnet for a hard disk drive, such as a magnet for a spindle motor or a voice coil motor of a hydrogen-filled hard disk drive, that overcomes at least some of the shortcomings of the prior art.

Disclosed here is a magnet comprising a magnet body. The magnet body comprises a plurality of coated magnetic granules. Each coated magnetic granule of the plurality of coated magnetic granules comprises a magnetic granule and a metallic layer coating the magnetic granule. The preceding subject matter of this paragraph characterizes example 1 of the present disclosure.

The magnet body further comprises a polymer matrix. The plurality of coated magnetic granules is suspended in the polymer matrix. The preceding subject matter of this paragraph characterizes example 2 of the present disclosure, wherein example 2 also includes the subject matter according to example 1, above.

Each coated magnetic granule of the plurality of coated magnetic granules is spaced apart from any other coated magnetic granule of the plurality of coated magnetic granules by a portion of the polymer matrix. The preceding subject matter of this paragraph characterizes example 3 of the present disclosure, wherein example 3 also includes the subject matter according to example 2, above.

The magnet further comprises a polymer overcoat layer encapsulating the magnet body. The preceding subject matter of this paragraph characterizes example 4 of the present disclosure, wherein example 4 also includes the subject matter according to any one of examples 1-3, above.

A portion of at least one coated magnetic granule of the plurality of coated magnetic granules defines an exterior surface of the magnet body. The preceding subject matter of this paragraph characterizes example 5 of the present disclosure, wherein example 5 also includes the subject matter according to any one of examples 1-4, above.

A size of each coated magnetic granule of the plurality of coated magnetic granules is different that the size of at least one other coated magnetic granule of the plurality of coated magnetic granules. The preceding subject matter of this paragraph characterizes example 6 of the present disclosure, wherein example 6 also includes the subject matter according to any one of examples 1-5, above.

For each coated magnetic granule of the plurality of coated magnetic granules, the metallic layer encapsulates the magnetic granule. The preceding subject matter of this paragraph characterizes example 7 of the present disclosure, wherein example 7 also includes the subject matter according to any one of examples 1-6, above.

Further disclosed herein is a method of making a magnet. The method of making a magnet comprises coating each magnetic granule of a magnet powder with a metallic coating to form a plurality of coated magnetic granules. The method also comprises forming the plurality of coated magnetic granules into a magnet body. The preceding subject matter of this paragraph characterizes example 8 of the present disclosure.

The step of forming the plurality of coated magnetic granules into the magnet body comprises suspending the plurality of coated magnetic granules in a polymer matrix. The preceding subject matter of this paragraph characterizes example 9 of the present disclosure, wherein example 9 also includes the subject matter according to example 8, above.

The step of suspending the plurality of coated magnetic granules in the polymer matrix comprises infusing a flowing form of the polymer matrix between the plurality of coated magnetic granules and hardening the polymer matrix. The preceding subject matter of this paragraph characterizes example 10 of the present disclosure, wherein example 10 also includes the subject matter according to example 9, above.

The step of suspending the plurality of coated magnetic granules in the polymer matrix comprises spacing each coated magnetic granule of the plurality of coated magnetic granules apart from any other coated magnetic granule of the plurality of coated magnetic granules by a portion of the polymer matrix. The preceding subject matter of this paragraph characterizes example 11 of the present disclosure, wherein example 11 also includes the subject matter according to any one of examples 9-10, above.

The method further comprises shaping the magnet body into a desired shape using a mold before hardening the polymer matrix. The preceding subject matter of this paragraph characterizes example 12 of the present disclosure, wherein example 12 also includes the subject matter according to example 9, above.

The method further comprises coating the magnet body with a polymer overcoat layer. The preceding subject matter of this paragraph characterizes example 13 of the present disclosure, wherein example 13 also includes the subject matter according to any one of examples 8-12, above.

The step of coating the magnet body with the polymer overcoat layer comprises encapsulating the magnet body with the polymer overcoat layer. The preceding subject matter of this paragraph characterizes example 14 of the present disclosure, wherein example 14 also includes the subject matter according to example 13, above.

The step of forming the plurality of coated magnetic granules into the magnet body comprises compressing the plurality of coated magnetic granules into a desired shape using a mold. The preceding subject matter of this paragraph characterizes example 15 of the present disclosure, wherein example 15 also includes the subject matter according to any one of examples 8-14, above.

Additionally disclosed herein is a magnetic storage device. The magnetic storage device comprises an actuatable component. The magnetic storage device also comprises a motor coupled to and operable to actuate the actuatable component. The motor comprises a magnet comprising a magnet body. The magnet body comprises a plurality of coated magnetic granules. Each coated magnetic granule of the plurality of coated magnetic granules comprises a magnetic granule and a metallic layer coating the magnetic granule. The preceding subject matter of this paragraph characterizes example 16 of the present disclosure.

The magnet body further comprises a polymer matrix. The plurality of coated magnetic granules is suspended in the polymer matrix. The preceding subject matter of this paragraph characterizes example 17 of the present disclosure, wherein example 17 also includes the subject matter according to example 16, above.

The magnetic storage device is a hard disk drive, and the hard disk drive is filled with hydrogen. The preceding subject matter of this paragraph characterizes example 18 of the present disclosure, wherein example 18 also includes the subject matter according to any one of examples 16-17, above.

The actuatable component is a spindle, and the motor is a spindle motor. The preceding subject matter of this paragraph characterizes example 19 of the present disclosure, wherein example 19 also includes the subject matter according to any one of examples 16-18, above.

The actuatable component is a carriage with carriage arms. The motor is a voice coil motor, selectively operable to move the carriage and carriage arms. The preceding subject matter of this paragraph characterizes example 20 of the present disclosure, wherein example 20 also includes the subject matter according to any one of examples 16-18, above.

The described features, structures, advantages, and/or characteristics of the subject matter of the present disclosure may be combined in any suitable manner in one or more examples and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example or implementation. In other instances, additional features and advantages may be recognized in certain examples and/or implementations that may not be present in all examples or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended numbered paragraphs, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawings, which are not necessarily drawn to scale, depict only certain examples of the subject matter and are not therefore to be considered to be limiting of its scope, the subject matter will be described and explained with additional specificity and detail through the use of the drawings, in which.

DETAILED DESCRIPTION

Reference throughout this specification to "one example," "an example," or similar language means that a particular feature, structure, or characteristic described in connection with the example is included in at least one example of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the present disclosure, however, absent an express correlation to indicate otherwise, an implementation may be associated with one or more examples.

As presented above, the unique characteristics of hydrogen, when used to fill the interior cavity of a hard disk drive, introduce unforeseen performance and reliability issues associated with the hard disk drive. For example, magnets conventionally suitable for helium-filled hard disk drives are not suitable for hydrogen-filled hard disk drives. More specifically, some conventional hard disk drive magnets are susceptible to embrittlement under prolonged exposure to hydrogen. Magnets made of neodymium, and other similar materials, such as rare-earth elements, are particularly susceptible to hydrogen exposure.

To help mitigate embrittlement in hydrogen-enriched environments, sintered magnets, such as those for the voice coil motor of a hard disk drive, can be coated with a metal-coating layer and a metal oxide/nitride layer after the magnetic powder is sintered. However, for non-sintered magnets, such as those formed by bonding together a magnetic powder with a polymer matrix (e.g., spindle motor magnets or voice coil motor magnets), the magnetic granules suspended in the polymer matrix are not adequately protected against hydrogen exposure because the polymer matrix allows hydrogen to permeate through to the magnetic granules, even when the entire magnet body is coated with a polymer overcoat layer. Furthermore, coating the entire magnet body with a metal-coating layer and/or metal oxide/nitride layer, with or without an interior polymer overcoat layer, does not provide adequate protection against hydrogen exposure as one or more of the metallic layers is still susceptible to defects, such as cracks, deformation, and/or cleavage. The source of these defects may be an incompatible interface between the metallic layers and the interior polymer overcoat layer and/or a rough interface between the bonded magnetic powder/polymer matrix compound and the metallic layers that is exacerbated by the hydrogen-enriched environment.

Figure 1:
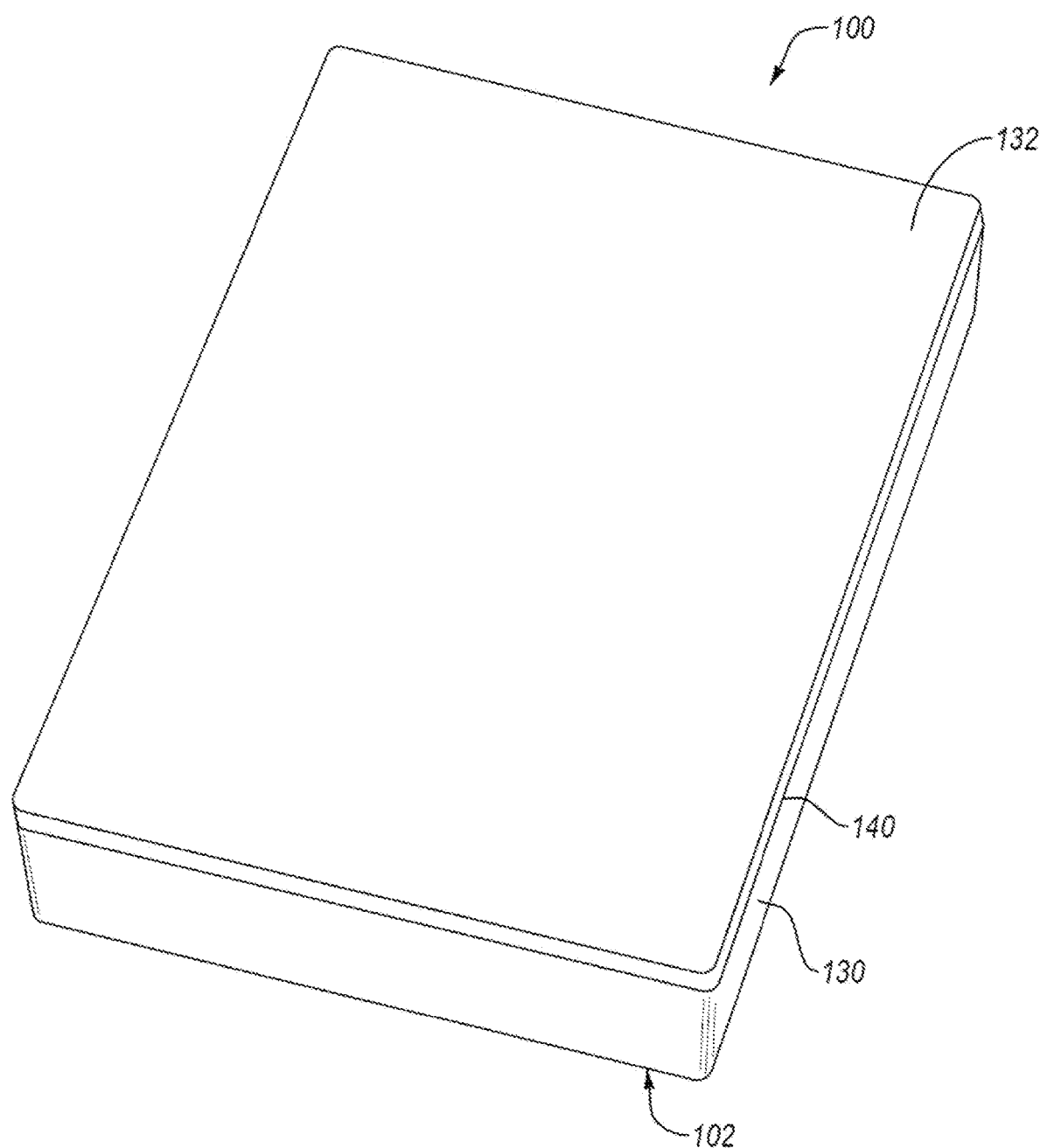
FIG. 1 is a perspective view of a magnetic storage device, according to one or more examples of the present disclosure.

Described herein is a magnet, for use in a hydrogen-enriched environment within a magnetic storage device, that overcomes the above-discussed shortcomings of conventional magnets. Referring to FIG. 1, a magnetic storage device 100 (e.g., magnetic recording device), according to one example, is depicted as a hard disk drive (HDD). However, in other examples, the magnetic storage device 100 can be any of various magnetic storage devices without departing from the essence of the subject matter of the present disclosure. The magnetic storage device 100 includes a housing 102 that seals or encloses an interior cavity 114 defined within the housing (see, e.g., FIG. 2). The housing 102 includes a base 130 and a cover 132 (shown in dashed lines in FIG. 2 so as not to obscure internal features of the magnetic storage device 100 within the interior cavity 114 of the housing 102). The cover 132 is coupled to the base 130 to enclose the interior cavity 114 from the environment exterior to the housing 102. In some implementations, a seal or gasket is positioned between the base 130 and the cover 132 to promote a hermetic seal between the base 130 and the cover 132. In some examples, the seal between the base 130 and the cover 132 is sufficiently strong to retain, over time, the environmental conditions within the interior cavity 114 at the time the housing 102 is sealed.

Figure 2:
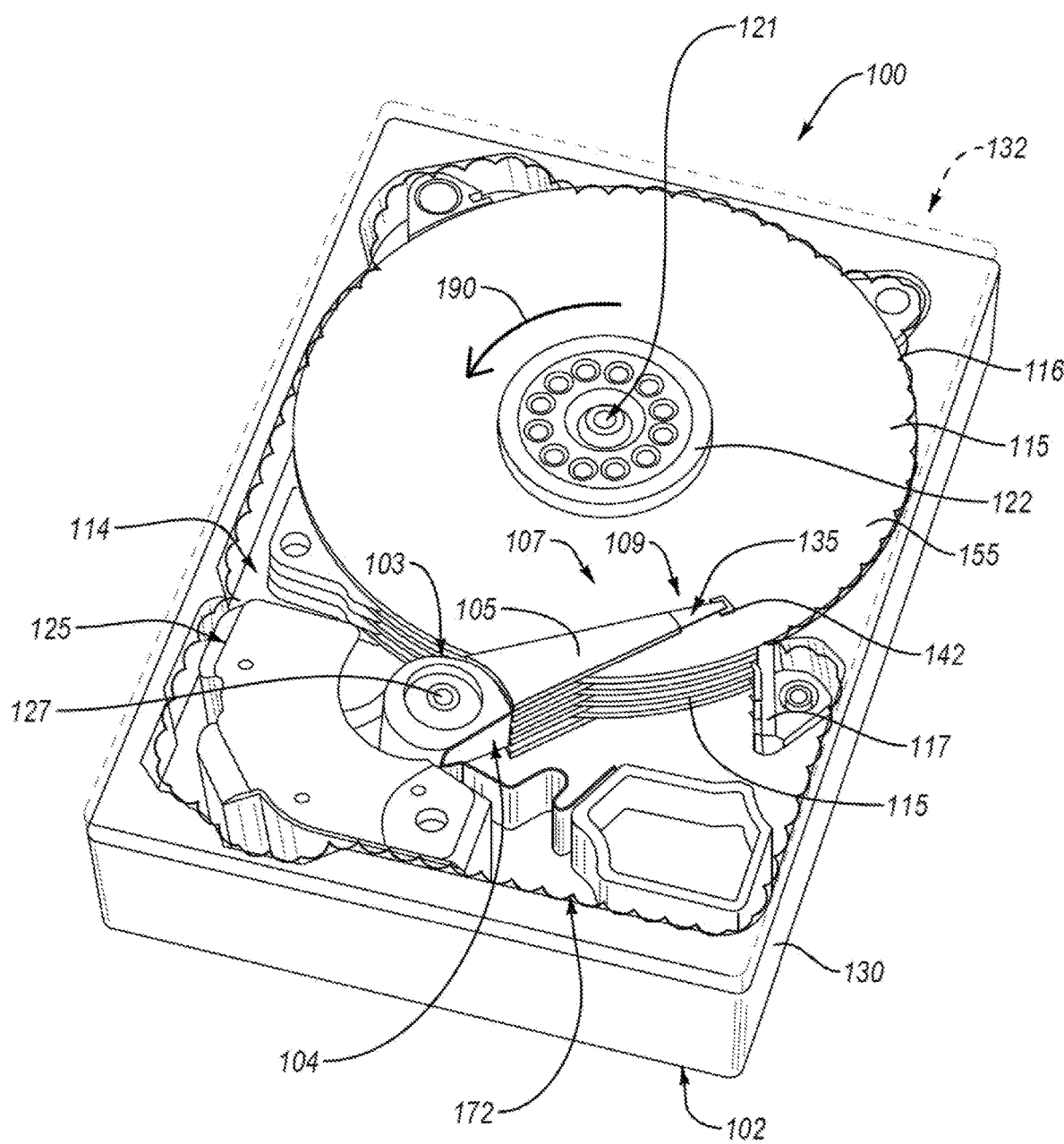
FIG. 2 is a perspective view of the magnetic storage device of FIG. 1, shown with a cover of a housing of the magnetic storage device in hidden view, according to one or more examples of the present disclosure.

Referring to FIG. 2, the magnetic storage device 100 includes various features located within the interior cavity 114 of the housing 102. In some examples, the magnetic storage device 100 includes a carriage 103, disks 115, a spindle motor 121, and a voice coil motor (VCM) 125 within the interior cavity 114. Each of the spindle motor 121 and the VCM 125 includes at least one magnet, made of neodymium or similar material, that facilitate operation of the spindle motor 121 and the VCM 125, respectively. The carriage 103 includes a head stack assembly 107 that includes a plurality of carriage arms 105 and at least one head-gimbal assembly 109 (e.g., suspension) coupled to the distal tip of each carriage arm of the plurality of carriage arms 105. In the illustrated example of FIG. 2, only one head-gimbal assembly 109 is shown coupled to the distal tip of each carriage arm 105 of the plurality of carriage arms 105. However, it is noted that each carriage arm 105 may have another head-gimbal assembly 109 on an opposite side of the carriage arm, which mirrors the head-gimbal assembly 109 shown. Each head-gimbal assembly 109 includes a suspension assembly 135 and a slider 142.

Although the magnetic storage device 100 in FIG. 1 is shown to have five carriage arms 105 and four disks 115, in other examples the magnetic storage device 100 can have fewer or more than five carriage arms 105 or fewer or more than four disks 115. In one example, each side of each carriage arm 105 facing a disk 115 has a head-gimbal assembly 109 (e.g., each of bottom and top carriage arms 105 can have one head-gimbal assembly 109 and each of middle carriage arms 105, between the bottom and top carriage arms 105, can have two head-gimbal assemblies 109). Similarly, although the magnetic storage device 100 is shown to have one spindle motor 121 and one VCM 125, in other examples, the magnetic storage device 100 can have any number of spindle motors 121 and VCMs 125.

The spindle motor 121 is coupled to the base 130. Generally, the spindle motor 121 includes a stationary portion non-movably fixed relative to the base 130 and a spindle that is rotatable relative to the stationary portion and the base 130. Accordingly, the spindle of the spindle motor 121 can be considered to be part of or integral with the spindle motor. Generally, the spindle motor 121 is operable to rotate the spindle relative to the base 130. The disks 115, or platters, are co-rotatably fixed to the spindle of the spindle motor 121 via respective hubs 122, which are co-rotatably secured to respective disks 115 and the spindle. As the spindle of the spindle motor 121 rotates, the disks 115 correspondingly rotate. In this manner, the spindle of the spindle motor 121 defines a rotational axis of each disk 115. The spindle motor 121 can be operatively controlled to rotate the disks 115, in a rotational direction 190, a controlled amount at a controlled rate.

Each of the disks 115 may be any of various types of magnetic storage media. Generally, in one example, each disk 115 includes a substrate and a magnetic material applied directly or indirectly onto the substrate. For example, the magnetic material of the disks 115 may be conventional granular magnetic storage disks or wafers that have magnetic layer bits with multiple magnetic grains on each bit. In granular magnetic media, all of the bits are co-planar and the surface 116 of the disk is substantially smooth and continuous. In one example, each bit has a magnetic dipole moment that can either have an in-plane (longitudinal) orientation or an out-of-plane (perpendicular) orientation.

As the disks 115 rotate in a read-write mode, the VCM 125 electromagnetically engages voice coils of the carriage arms 105 to rotate the carriage arms 105, and the head-gimbal assemblies 109, which are coupled to the carriage arms 105, relative to the disks 115 in a rotational direction along a plane parallel to read-write surfaces 155 of the disks 115. The carriage arms 105 can be rotated to position the read-write head of the head-gimbal assemblies 109 over a specified radial area of the read-write surface 155 of a corresponding disk 115 for read and/or write operations. The VCM 125 is fixed to the base 130 in engagement with the voice coils of the carriage arms 105, which are rotatably coupled to the base 130 via a spindle 127 extending through the carriage 103. Generally, the spindle 127 defines a rotational axis about which the carriage arms 105 rotate when actuated by the VCM 125.

The carriage arms 105 are non-movably fixed to (e.g., integrally formed as a one-piece unitary monolithic body with) and extend away from a base of the carriage 103 in a spaced-apart manner relative to each other. In some implementations, each of the carriage arms 105 is spaced an equi-distance apart from and extend parallel relative to adjacent carriage arms 105. A respective one of the disks 115 is positioned between adjacent carriage arms 105. In an idle mode (e.g., when read-write operations are not being performed), the VCM 125 is actuated to rotate the carriage arms 105, in a radially outward direction relative to the disks 115, such that the head-gimbal assemblies 109 are parked or unloaded onto a ramp support 117 secured to the base 130.

For each head-gimbal assembly 109, the electrical signals are transmitted from and to the read-write head 158 of the slider 142 via electrical traces or lines formed in or coupled to the slider 142. The electrical traces of the slider 142 are electrically interconnected to facilitate transmission of electrical signals between the read-write head 158 and a control module of the magnetic storage device 100. The control module is configured to process the electrical signals and facilitate communication of the electrical signals between the magnetic storage device 100 and one or more external computing devices. Generally, the control module includes software, firmware, and/or hardware used to control operation of the various components of the magnetic storage device 100. The control module may include a printed circuit board on or in which the hardware is mounted.

The slider 142 of the head-gimbal assembly 109 is configured to support the read-write head 158 at a proper flying height above a read-write surface 155 of a corresponding one of the disks 115. Although not shown, the slider 142 may include an air bearing surface of side rails that glide along the read-write surface 155 as the disk 115 rotates relative to the head-gimbal assembly 109. Alternatively, the slider 142 may include an air bearing surface of complex shapes, which includes shallow and deep grooves, configured to predictably position the slider 142 above the read-write surface 155 of the disk 115. The slider 142 can be made of any of various materials, such as low friction materials. For example, in one implementation, the body of the slider 142 is made of ceramics, such as, for example, aluminum oxide titanium carbide ($Al_2O_3$—TiC). In some implementations, although not shown, the slider 142 may include a thermal flying-height control (TFC) actuator to adjust the flying height of the read-write head relative to the read-write surface 155.

To promote the efficient and reliable operation of the components within the interior cavity 114 of the magnetic storage device 100, a gas 172 (shown schematically) is introduced into the interior cavity 114 to create a gas-enriched atmosphere within the interior cavity 114. In one implementation, the gas 172 can include a gas with a density lower than air. The gas 172 is helium, in some certain examples, which can promote a reduction in the power consumption of the magnetic storage device 100, and the gas 172 is hydrogen, in some other examples, which can promote a further reduction in the power consumption compared to helium.

Figure 3:
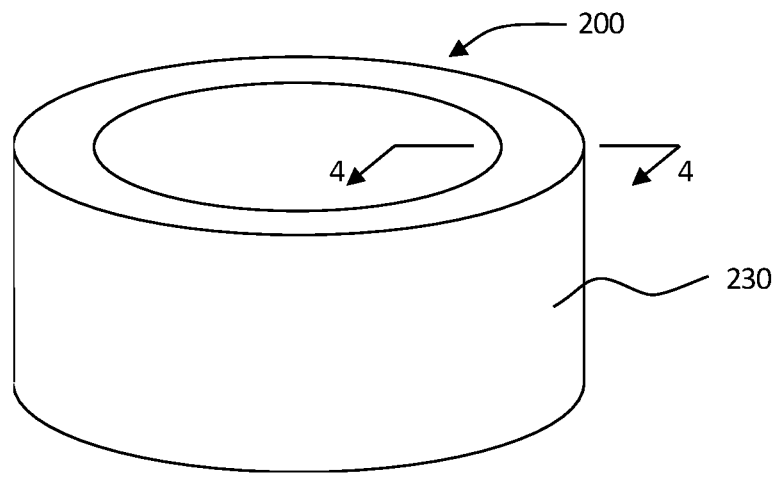
FIG. 3 is a perspective view of a magnet, according to one or more examples of the present disclosure.
Figure 4:
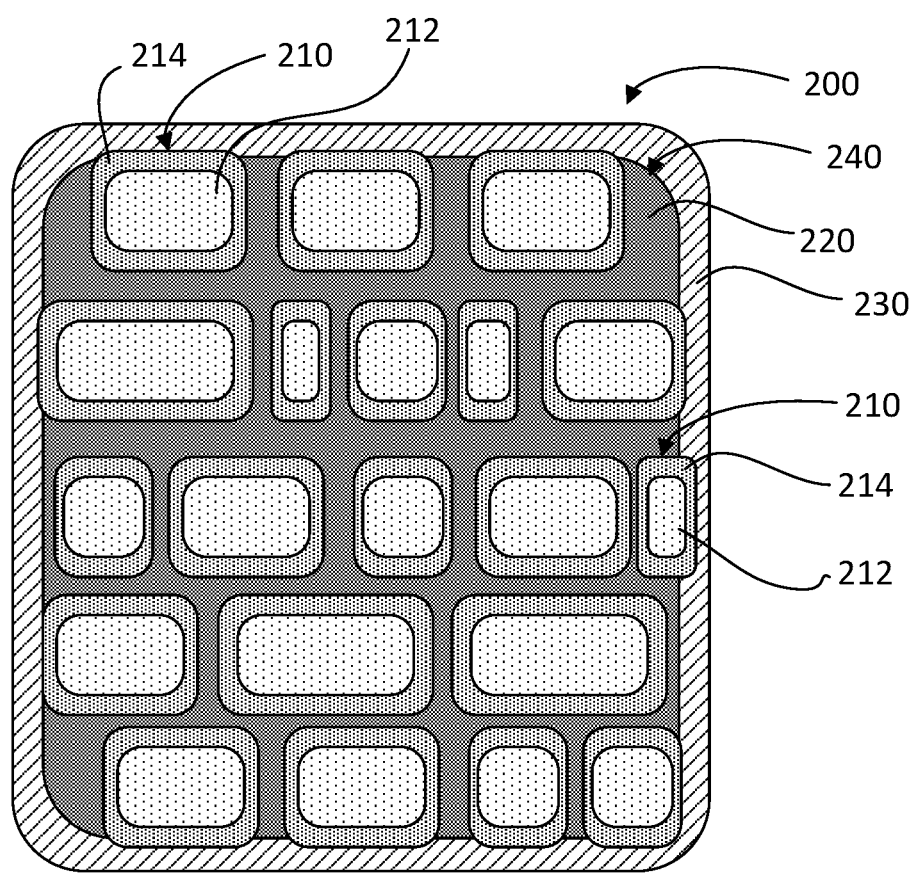
FIG. 4 is a cross-sectional side elevation view of the magnet of FIG. 3, taken along the line 4-4 of FIG. 3, according to one or more examples of the present disclosure.

Referring to FIG. 3, according to some examples, disclosed herein is a magnet 200. The magnet 200 is used in a magnetic storage device 100 that has been filled with hydrogen, in some examples. The magnet 200 is shown schematically, in a perspective view, in FIG. 3. The magnet 200 is a component of the magnetic storage device 100. More particularly, in certain examples, the magnet 200 forms part of the spindle motor 121 or the VCM 125. The magnet 200 is a non-sintered magnet. More particularly, as will be described in more detail below, the magnet 200 is a polymer-bonded magnet. The magnet 200 is depicted in the illustrated example of FIG. 3 as having a ring or hollow cylinder shape, with a rectangular-shaped cross-section, as shown in FIG. 4. However, the magnet 200 can form any of various shapes and have any of various cross-sectional shapes. The magnet 200 includes a polymer overcoat layer 230 that defines an exterior or outermost surface of the magnet 200, in some examples. However, in other examples, the magnet 200 does not have a polymer overcoat layer or has a polymer overcoat layer that does not define an exterior or outermost surface of the magnet 200.

As shown in FIG. 4, which is a cross-sectional view of the magnet 200 of FIG. 3, taken along the line 4-4 of FIG. 3, the magnet 200 includes multiple features encapsulated by the polymer overcoat layer 230, or the outermost surface of the bonded magnet compound defined by the magnet mold. For example, the magnet 200 includes a plurality of coated magnetic granules 210 suspended in a polymer matrix 220. Each of the coated magnetic granules 210 includes a magnetic granule 212 coated with a metallic coating 214. Accordingly, each coated magnetic granule 210 is entirely coated (e.g., encapsulated) by a metallic coating 214 independent of other coated magnetic granules 210. The plurality of coated magnetic granules 210 and the polymer matrix 220 are encapsulated by the polymer overcoat layer 230, in some examples.

By individually coating each of the magnetic granules 212 with a metallic coating 214, as opposed to collectively coating a group of magnetic granules suspended in a polymer matrix with a metallic coating, any damage to the metallic coating 214 on one magnetic granule 212 does not affect other magnetic granules 212. Accordingly, unlike the case where a metallic overcoat collectively coats a group of magnetic granules suspended in a polymer matrix, damage to a metallic coating 214 is confined to the individual magnetic granule 212 and does not deteriorate the entire magnet 200. Additionally, because the metallic coating 214 is not coating an entirety of the polymer matrix 220, differences in thermal expansion between the metallic coating 214, the magnetic granules 212, and the polymer matrix 220 does not have the same negative effect on the overall performance and longevity of the magnet 200 as the case having a metallic overcoat collectively coating a group of magnetic granules suspended in a polymer matrix.

Figure 5:
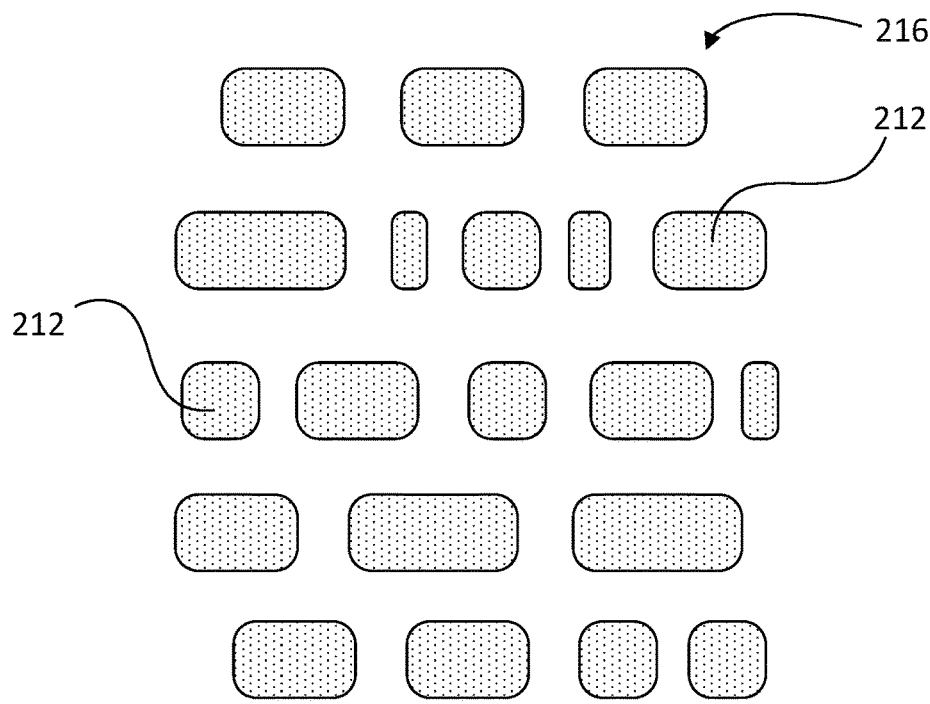
FIG. 5 is a cross-sectional view of a magnet powder, according to one or more examples of the present disclosure.
Figure 6:
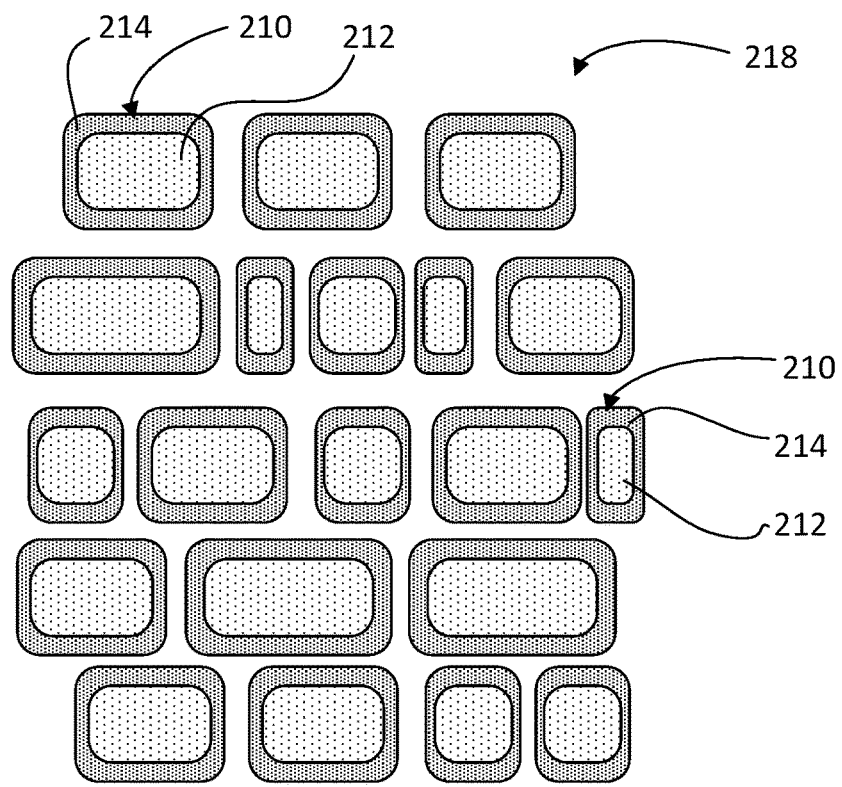
FIG. 6 is a cross-sectional view of a coated magnet powder, according to one or more examples of the present disclosure.
Figure 8:
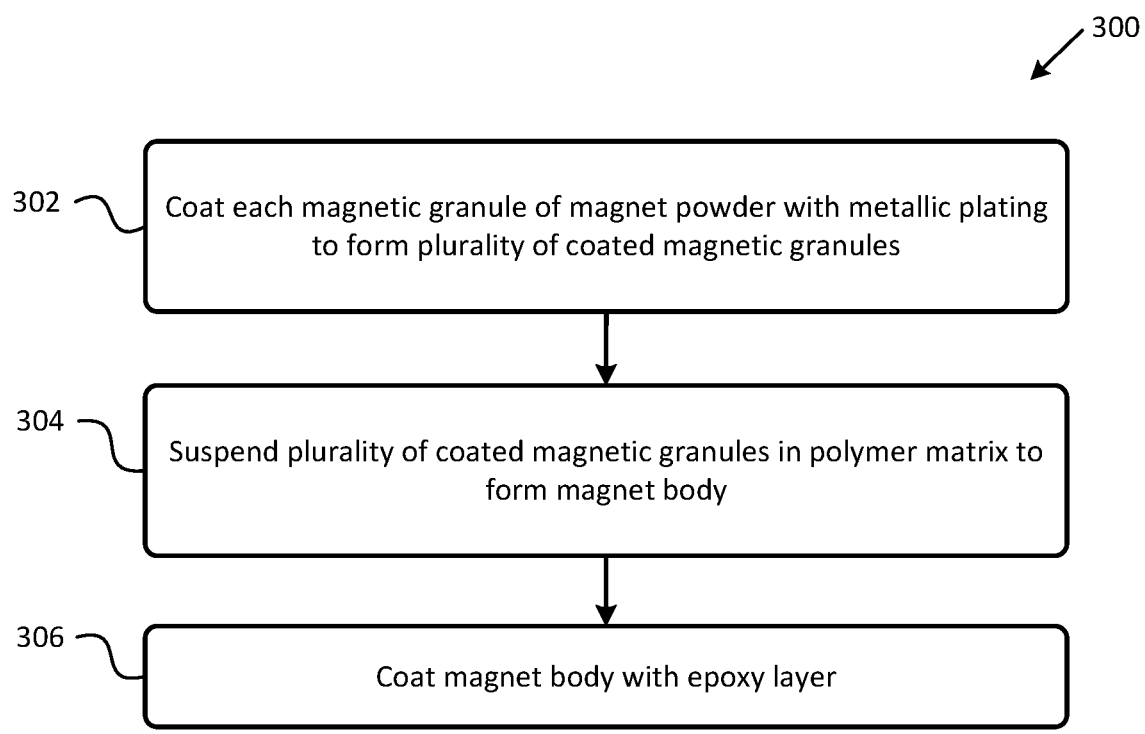
FIG. 8 is a schematic flow chart of a method of making a magnet, according to one or more examples of the present disclosure.

As shown in FIG. 8, also disclosed herein is one example of a method 300 of making the magnet 200. Referring to FIGS. 5 and 6, according to some examples, the method 300 includes (block 302) coating each magnetic granule 212 of a magnet powder 216 with the metallic coating 214 to form a plurality of coated magnetic granules 210. The plurality of coated magnetic granules 210 collectively form a coated magnet powder 218. The magnetic granules 212 of the magnet powder 216 can be differently sized and shaped (see, e.g., FIG. 5), such that each one of the coated magnetic granules 210 of the coated magnet powder 218 also can be differently sized and shaped (see, e.g., FIG. 6) relative to at least another one or some of the coated magnetic granules 210.

The magnetic granules 212 are made of a magnetic material. In one example, the magnetic granules 212 are made of a neodymium alloy. In other examples, the magnetic granules 212 are made of a samarium alloy or other rare-earth element alloy.

The magnetic granules 212 of the magnet powder 216 are coated using a physical deposition process, such as electroplating or electrodeposition processes, in some examples. In other examples, a chemical deposition process, such as dip coating, chemical vapor deposition, spin coating, and the like, is used to coat each of the magnetic granules 212 with the metallic coating 214. In other examples, a sputter process is used to coat each of the magnetic granules 212 with the metallic coating 214. The metallic coating 214 is made of a non-magnetic metallic material. According to one example, the metallic coating 214 is made of copper. In other examples, the metallic coating 214 is made of one or more of nickel, chromium, zinc, gold, silver, aluminum, lead, cobalt, and tin. According to certain examples, each magnetic granule 212 has one or more polymer coatings, made of a material such as one or more of an epoxy, polyamide, or polyphenylene-sulfide material, and the metallic coating 214 is coated over and/or under the polymer coating.

Figure 7:
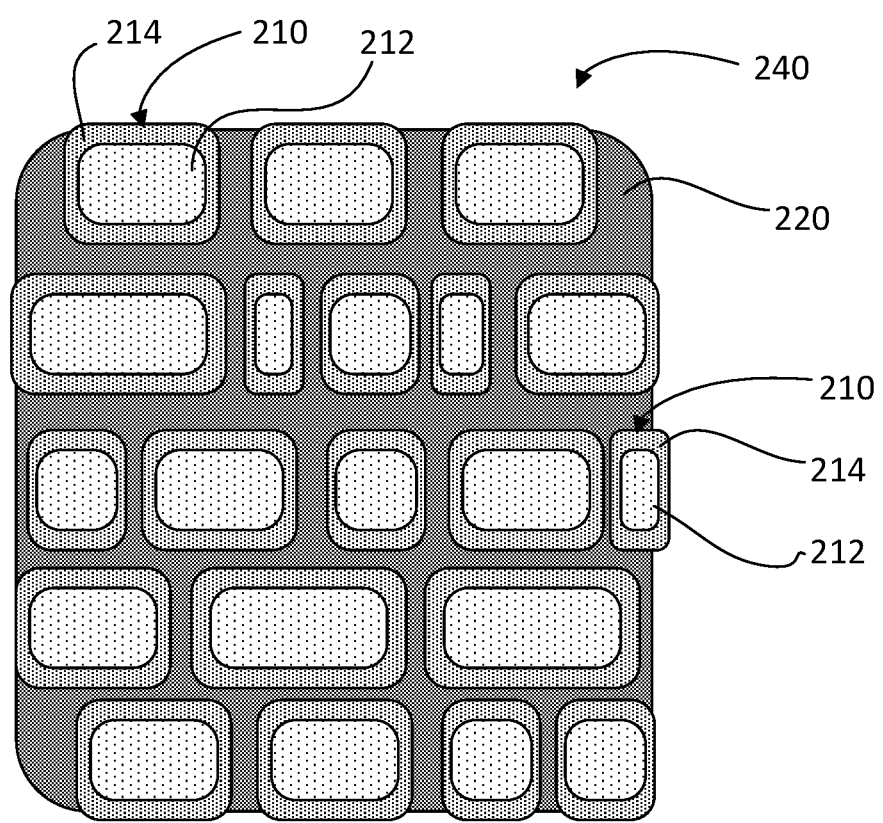
FIG. 7 is a cross-sectional view of a magnet body, according to one or more examples of the present disclosure.

Referring to FIG. 7, the method 300 additionally includes (block 304) suspending the coated magnetic granules 210 of the coated magnet powder 218 in the polymer matrix 220 to form a magnet body 240. In some examples, suspending the coated magnetic granules 210 in the polymer matrix 220 includes infusing a liquid or flowing form of the polymer matrix 220 into the coated magnet powder 218, between the coated magnetic granules 210, and hardening the polymer matrix 220 to set in place the coated magnetic granules 210 in the polymer matrix 220. In one implementation, the polymer matrix 220 is made of a thermoset material (e.g., resin, epoxy, etc.) that is infused into the coated magnetic powder 218 in a flowable state and, once infused, heated above a cure temperature of the polymer matrix 220 to cure and harden the polymer matrix 220. According to another implementation, the polymer matrix 220 is a thermoplastic material (e.g., polyamide, polyphenylene-sulfide, etc.) that is infused into the coated magnetic powder 218 in a flowable state and, once infused, allowed to cool to harden the polymer matrix 220. Generally, after infusion and setting of the polymer matrix 220, each one of the coated magnetic granules 210 is spaced apart from any other coated magnetic granule 210 by a portion of the polymer matrix 220. However, in some examples, at least some of the coated magnetic granules 210 suspended in the polymer matrix 220 are in contact with one or more adjacent coated magnetic granules 210.

Forming the magnet body 240 may also include depositing the coated magnetic granules 210 and infused polymer matrix 220, before the polymer matrix 220 has hardened, into a mold to shape the magnet body 240 into a desired shape. After the polymer matrix 220 hardens, the magnet body 240 is removed from the mold and has the desired shape.

Referring back to FIG. 4, after the magnet body 240 is formed, the method 300, in certain examples, also includes (block 306) coating the magnet body 240 with the polymer overcoat layer 230. In some examples, the polymer overcoat layer 230 is deposited so as to encapsulate the magnet body 240. The polymer overcoat layer 230 can be deposited onto the magnet body 240 using any of various deposition processes. In one example, the polymer overcoat layer 230 is deposited onto the magnet body 240 using an electrodeposition process. The polymer overcoat layer 230 is made of any of various epoxy materials, such as bisphenol A epoxy resin.

It is recognized that in some examples, such as shown in FIG. 7, the polymer matrix 220 will not entirely encapsulate each of the coated magnetic granules 210. Instead, some of the coated magnetic granules 210 at the outer periphery of the magnet body 240 may have portions not coated by the polymer matrix 220. In the case where the magnet 200 does not have a polymer overcoat layer 230, these exposed portions of the coated magnetic granules 210 would partially define the exterior surface of the magnet body 240. If the exposed coated magnetic granules 210 did not have a metallic coating 214, the exposure of the magnetic granule 212 could have a negative impact on coverage of a metallic coating if a metallic coating collectively coated a group of magnetic granules 212 suspended in a polymer material and the individual magnetic granules 212 were not covered with the metallic coating 214. However, because each magnetic granule 212 is coated with the metallic coating 214, the magnet 200 of the present disclosure avoids this issue.

The ratio of magnetic granules 212 to polymer matrix 220 of the magnet body 240 is selected to provide a desired magnetic property within a desired spatial constraint. This ratio can be expressed as a volume percentage of magnetic granules 212 relative to the volume of the magnet 200 or a percent composition of magnetic granules 212 in the magnet 200. In some examples, the quantity and size of the magnetic granules 212, as well as the thickness and the composition of the metallic coating 214, are screened and optimized to produce the desired volume percentage or percent composition of magnetic granules 212 in the magnet 200.

Figure 9:
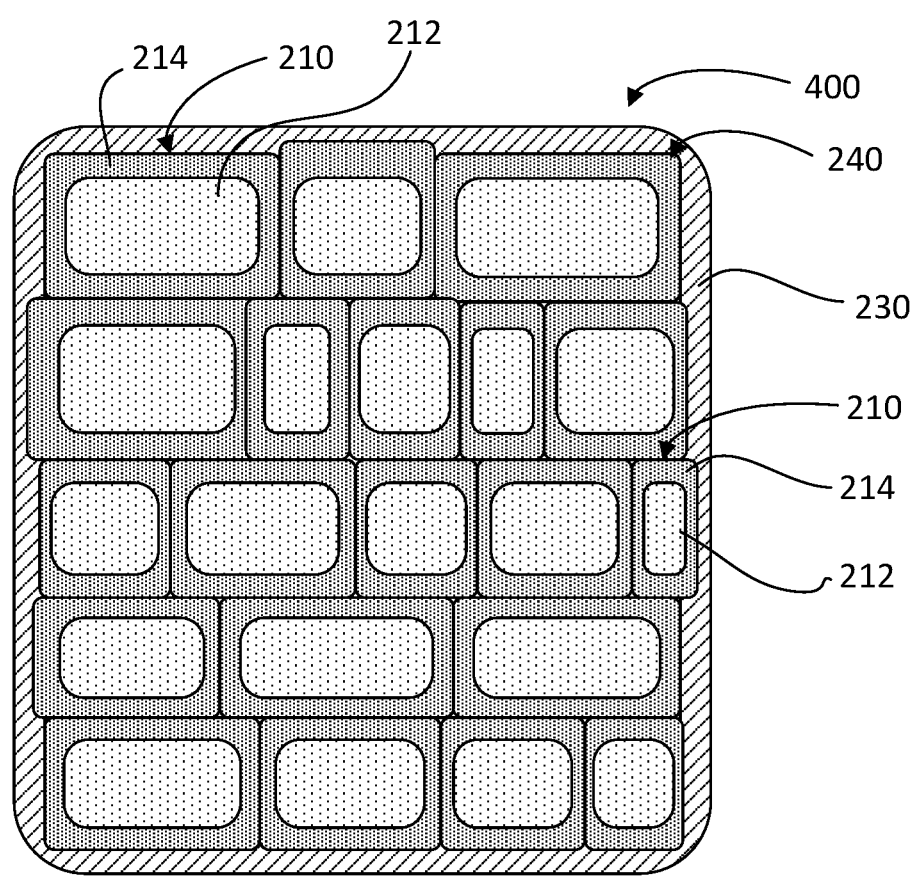
FIG. 9 is a cross-sectional side elevation view of a magnet, taken along a line similar to line 4-4 of FIG. 3, according to one or more examples of the present disclosure.

Referring to FIG. 9, and according to another example, a magnet 400 includes a magnet body 240 having a plurality of coated magnetic granules 210. However, unlike the magnet 200, the magnet body 240 of the magnet 400 does not include a polymer matrix. In other words, the coated magnetic granules 210 of the magnet 400 are not suspended in a polymer matrix. Instead, the coated magnetic granules 210 are compressed together to form the magnet body 240 of the magnet 400. Compression of the coated magnetic granules 210 against adjacent ones of the coated magnetic granules 210 is facilitated by the relatively ductile and compressible nature of the metallic coating 214 encapsulating each of the magnetic granule 212. In other words, the metallic coatings 214 of the coated magnetic granules 210 may be deformable to substantially fill the spacing between the coated magnetic granules 210 and to help bind together the coated magnetic granules 210 to form the magnet body 240. The magnet 400 includes a polymer overcoat layer 230 that encapsulates the magnet body 240 in some examples, such as shown in FIG. 9. However, in other examples, the magnet 400 does not include a polymer overcoat layer such that exposed portions of the coated magnetic granules 210 would define the exterior surface of the magnet body 240.

The magnet 400 can be made using the method 300, as described above, but skipping or without performing the step, at block 304, of suspending the coated magnetic granules 210 of the coated magnet powder 218 in a polymer matrix 220 to form the magnet body 240. Instead, the method 300 includes a compression step that compresses together the coated magnetic granules 210 in a mold to form the magnet body 240.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two." Moreover, unless otherwise noted, as defined herein a plurality of particular features does not necessarily mean every particular feature of an entire set or class of the particular features.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method.

Additionally, the order in which a particular method occurs may or may not strictly adhere to the order of the corresponding steps shown.

The present subject matter may be embodied in other specific forms without departing from its spirit or essential characteristics. The described examples are to be considered in all respects only as illustrative and not restrictive. Examples of the scope of the present subject matter can be found in the following numbered paragraphs.

The invention claimed is:

1. A hard disk drive, comprising:
a spindle;
a carriage comprising carriage arms; and
a motor coupled to and operable to actuate one of the spindle or the carriage, wherein the motor comprises a magnet, comprising a magnet body that comprises a plurality of coated magnetic granules, wherein each coated magnetic granule of the plurality of coated magnetic granules comprises a magnetic granule and a metallic layer coating the magnetic granule.

2. The hard disk drive according to claim 1, wherein:
the magnet body further comprises a polymer matrix; and
the plurality of coated magnetic granules is suspended in the polymer matrix.

3. The hard disk drive according to claim 2, wherein each coated magnetic granule of the plurality of coated magnetic granules is spaced apart from any other coated magnetic granule of the plurality of coated magnetic granules by a portion of the polymer matrix.

4. The hard disk drive according to claim 1, wherein the magnet further comprises a polymer overcoat layer encapsulating the magnet body.

5. The hard disk drive according to claim 1, wherein a portion of at least one coated magnetic granule of the plurality of coated magnetic granules defines an exterior surface of the magnet body.

6. The hard disk drive according to claim 1, wherein a size of each coated magnetic granule of the plurality of coated magnetic granules is different that the size of at least one other coated magnetic granule of the plurality of coated magnetic granules.

7. The hard disk drive according to claim 1, wherein, for each coated magnetic granule of the plurality of coated magnetic granules, the metallic layer encapsulates the magnetic granule.

8. A method of making a magnetic storage device, the method comprising:
coating each magnetic granule of a magnet powder with a metallic coating to form a plurality of coated magnetic granules;
forming the plurality of coated magnetic granules into a magnet body; and
operably coupling a motor to an actuatable component of the magnetic storage device, wherein the motor comprises the magnet body and is operable to actuate the actuatable component.

9. The method according to claim 8, wherein the step of forming the plurality of coated magnetic granules into the magnet body comprises suspending the plurality of coated magnetic granules in a polymer matrix.

10. The method according to claim 9, wherein the step of suspending the plurality of coated magnetic granules in the polymer matrix comprises infusing a flowing form of the polymer matrix between the plurality of coated magnetic granules and hardening the polymer matrix.

11. The method according to claim 9, wherein the step of suspending the plurality of coated magnetic granules in the polymer matrix comprises spacing each coated magnetic granule of the plurality of coated magnetic granules apart from any other coated magnetic granule of the plurality of coated magnetic granules by a portion of the polymer matrix.

12. The method according to claim 9, further comprising shaping the magnet body into a desired shape using a mold before hardening the polymer matrix.

13. The method according to claim 8, further comprising coating the magnet body with a polymer overcoat layer.

14. The method according to claim 13, wherein the step of coating the magnet body with the polymer overcoat layer comprises encapsulating the magnet body with the polymer overcoat layer.

15. The method according to claim 8, wherein the step of forming the plurality of coated magnetic granules into the magnet body comprises compressing the plurality of coated magnetic granules into a desired shape using a mold.

16. A magnetic storage device, comprising:
   an actuatable component; and
   a motor coupled to and operable to actuate the actuatable component, wherein:
      the motor comprises a magnet comprising a magnet body;
      the magnet body comprises a plurality of coated magnetic granules; and
      each coated magnetic granule of the plurality of coated magnetic granules comprises a magnetic granule and a metallic layer coating the magnetic granule.

17. The magnetic storage device according to claim 16, wherein:
   the magnet body further comprises a polymer matrix; and
   the plurality of coated magnetic granules is suspended in the polymer matrix.

18. The magnetic storage device according to claim 16, wherein:
   the magnetic storage device is a hard disk drive; and
   the hard disk drive is filled with hydrogen.

19. The magnetic storage device according to claim 16, wherein:
   the actuatable component is a spindle; and
   the motor is a spindle motor.

20. The magnetic storage device according to claim 16, wherein:
   the actuatable component is a carriage with carriage arms; and
   the motor is a voice coil motor, selectively operable to move the carriage and carriage arms.

* * * * *